United States Patent [19]

Lions

[11] 4,086,632

[45] Apr. 25, 1978

[54] AREA NAVIGATION SYSTEM INCLUDING A MAP DISPLAY UNIT FOR ESTABLISHING AND MODIFYING NAVIGATION ROUTES

[75] Inventor: Richard O. Lions, Bellevue, Wash.

[73] Assignee: The Boeing Company, Seattle, Wash.

[21] Appl. No.: 726,633

[22] Filed: Sep. 27, 1976

[51] Int. Cl.² ............................................. G06F 15/50
[52] U.S. Cl. .............................. 364/444; 343/112 C; 343/112 PT; 364/448; 364/521
[58] Field of Search ...................... 235/150.26, 150.27; 73/178 R; 340/24, 27 NA; 343/107, 112 C, 112 PT

[56] References Cited

U.S. PATENT DOCUMENTS

| | | | |
|---|---|---|---|
| 3,267,263 | 8/1966 | Nelson et al. | 235/150.27 |
| 3,392,448 | 7/1968 | Rock | 340/24 X |
| 3,474,556 | 10/1969 | Scovill | 343/112 PT X |
| 3,538,313 | 11/1970 | Thomas et al. | 235/150.27 |
| 3,623,090 | 11/1971 | Gilbert et al. | 343/112 PT X |
| 3,652,837 | 3/1972 | Perkins | 235/150.27 |
| 3,883,861 | 5/1975 | Heartz | 340/27 NA X |

Primary Examiner—Jerry Smith
Attorney, Agent, or Firm—Christensen, O'Connor, Johnson & Kindness

[57] ABSTRACT

An area navigation system including a map display unit for entering navigation information to form or modify a programmed navigational route is disclosed. The map display unit is connected to an area navigation computer to supply a cartographic display of a geographic area relevant to a particular navigation route. Specific geographic locations to be used as reference points, or to be eliminated from a previously programmed navigation route, are selected by means of a cursor symbol that is electronically generated on the cartographic display. The position of the cursor symbol and the geographic region displayed are controlled by a single switch located on a control apparatus. When a desired geographic reference point is selected by means of the switch and cursor symbol, operation of an approproate control either enters the coordinates of the selected geographic location into the area navigation computer for use as a new navigational reference point, or deletes the selected geographic location from a previously computed navigation route. The navigation route established by operation of the map display unit and the associated controls is temporarily stored in a provisional storage buffer and is displayed on the map display unit cartographic display. Accordingly, a complete navigational route or a complex modification of a previously established navigational route can be observed and verified prior to the initiation of output signals from the area navigation system.

12 Claims, 11 Drawing Figures

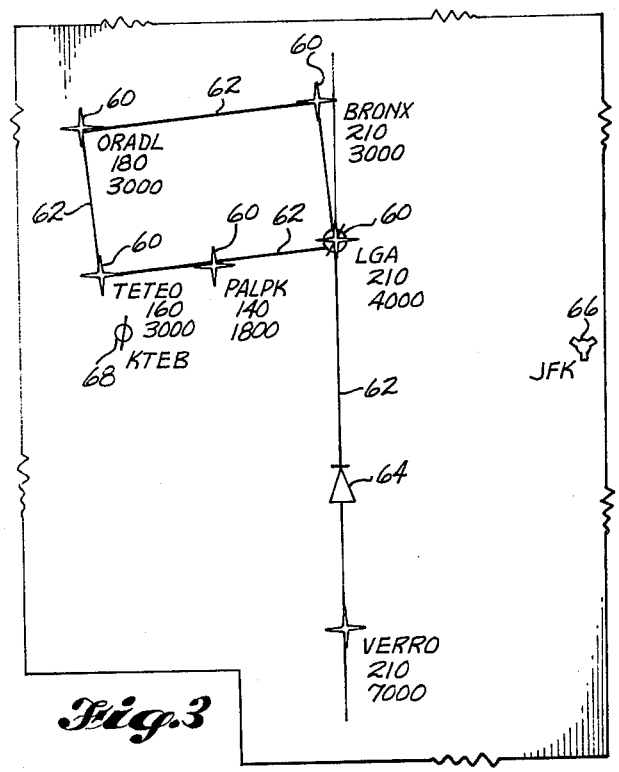
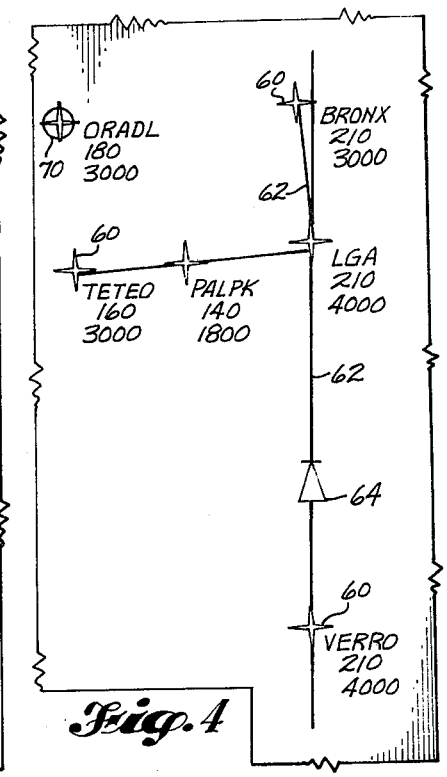
*Fig.3*
*Fig.4*
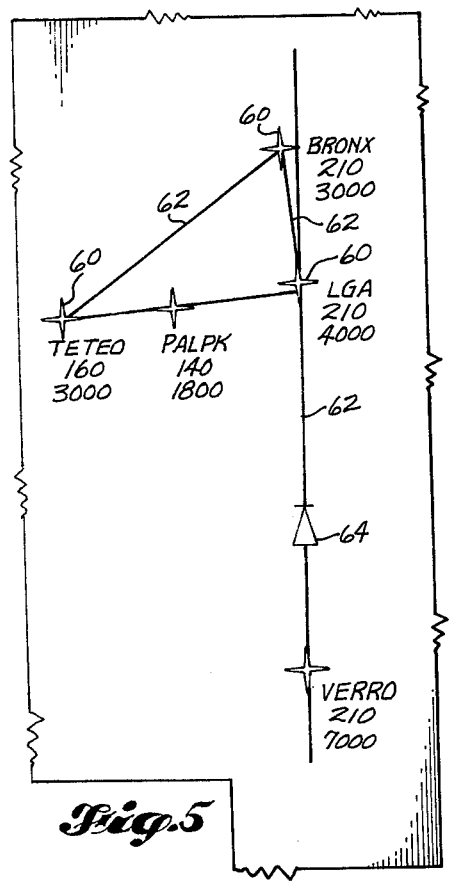
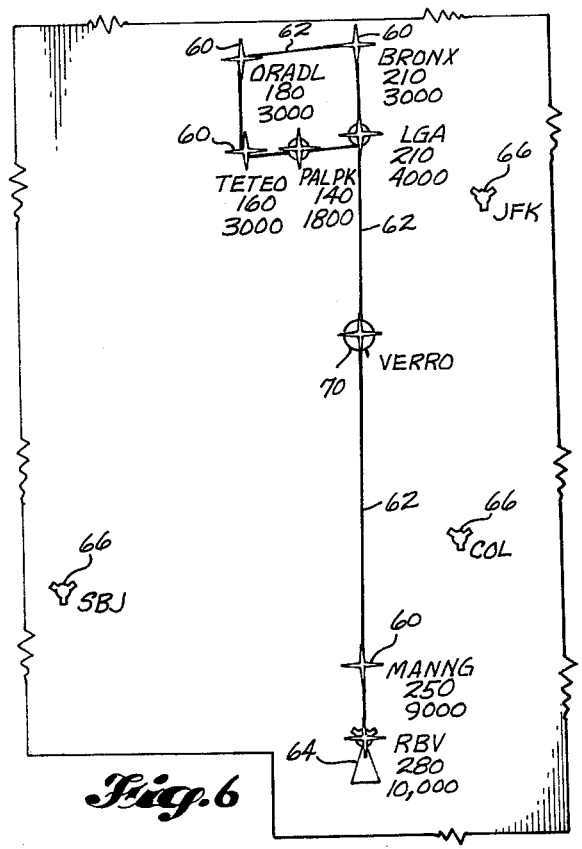
*Fig.5*
*Fig.6*

AREA NAVIGATION SYSTEM INCLUDING A MAP DISPLAY UNIT FOR ESTABLISHING AND MODIFYING NAVIGATION ROUTES

BACKGROUND OF THE INVENTION

This invention relates to aircraft navigation systems and in particular to area navigation systems.

Basically, the concept of area navigation includes the use of a wide variety of geographic reference points to establish a desired navigational route wherein the position of the aircraft is computed and command signals are generated that are representative of course corrections necessary to maintain the aircraft on the desired navigation route. The guidance paths that comprise the desired navigation route are not limited to flight paths which pass directly over radio navigation aids (navaids) but can include geographic landmarks such as cities, geographic references having a known location relative to a navaid, or even geographic references having no specific relation to radio navigation aids. Hence, in essence an area navigation system permits automatic navigation relative to a generalized coordinate system such as the lines of longitude and latitude.

Prior art area navigation systems vary greatly in structural complexity and system capability, ranging from a simple system that provides the capability of flying directly to a single geographic location having positional coordinates referenced to the location of an operating navaid to rather sophisticated systems in which a complex navigation route including many waypoints can be established prior to the departure of the aircraft.

The more sophisticated prior art area navigation systems include a programmable digital computer, a control display unit (CDU) for controlling the system and displaying data to the system operator, and may include a map display unit for the display of navigational information relative to a computer-generated map of a relevant geographic region. The programmable digital computer includes storage registers for storing the coordinates of geographic locations pertinent to the navigation route to be followed on any particular aircraft journey and includes an arithmetic unit for performing mathematical calculations.

In general, the computer is programmed to establish a desired navigation route prior to the departure of the aircraft. In a typical arrangement, the programming of the navigation system computer can be accomplished by operation of a keyboard and associated control switches located on the CDU, or can be accomplished by loading a complete navigation route directly into the storage registers of the navigational computer from an ancillary storage device. During the flight, the computer arithmetic unit calculates the position of the aircraft from input signals supplied by conventional aircraft navigation systems and calculates guidance control signals that are representative of the flight control necessary to maintain the aircraft on the desired navigation route. These control signals are displayed to the pilot for appropriate action and can also be coupled to an automatic flight control system for automatically flying the desired navigation route.

The use of a programmable digital computer within an area navigation system provides a great deal of system versatility. Since the computer is programmable, the system can facilitate the calculation and display of a wide variety of navigational data that is of value to the flight crew during various phases of the flight. For example, the position of the aircraft along the navigation path can be displayed along with the present attitude of the aircraft and various other information stored within the digital computer can be accessed to aid in planning changes in the navigation route. Further, programming capability permits the modification of the previously established navigation route, or the establishment of a completely new route whenever desired or necessary. For example, it is often advantageous to modify a navigation route so as to avoid a storm system. Additionally, changes in traffic density may cause an air traffic control center to direct an aircraft to a holding pattern or landing approach pattern other than that which has been previously programmed into the computer.

In prior art area navigation systems, the CDU's are arranged to serve as the sole or primary interface between the operator of the system and the system computer. Thus, the CDU must provide for the initial programming of the navigation computer, the inflight modification of a programmed navigation route, and for initiating system operation to provide any other desired features. Although a great deal of effort has centered about designing such a CDU so as to minimize the number of necessary controls and to simplify the operating procedure, prior art area navigation systems have considerable drawbacks in that system versatility has only been achieved by compromising the ease of operation. This compromise necessitates considerable training in order to operate the system and also requires the performance of fairly complex and time consuming tasks during time periods when the work load in performing other necessary flight duties is at a maximum. This is especially true of situations in which a change in the navigation route becomes necessary. For example, when flying under the jurisdiction of an air traffic control center, dense traffic patterns or ground conditions may cause the air traffic control center to order the crew to enter a holding pattern or divert to another destination for landing. During such times, each crew member generally has a number of duties to perform in order to monitor the operation of various aircraft systems and control the flight of the aircraft. Hence, the pilot may be forced to choose between navigating without the benefit of the area navigation system or diverting attention from other duties long enough to reprogram the area navigation system. Such a choice is undesirable since maximum safety is not achieved regardless of the decision that is made. Further, because of the additional work pressure during this time period, errors can be made if it is attempted to modify the navigation route. Such errors are not only detrimental to precise system operation, but may greatly increase the safety risk. Primarily because of the complex procedure required to operate the system, and the fact that other operational duties are often highest during the time period in which modification of the navigation route is required, such prior art area navigation systems have not been favorably received by flight crews.

Further in prior art systems, changes in the navigation route must often be executed in a particular operational sequence and the geographic reference points available for use in the new or modified navigation route have often been limited to those locations stored within the area navigation computer. Such limitations are undesirable from the standpoint of system versatility and also from the standpoint of the ease of operation.

Additionally, during the modification of a navigation route wherein the modification includes several changes, the prior art area navigation systems generally alter the programmed path as each change is entered via the CDU. Thus, the operator of the system does not have an opportunity to observe and verify the complete modified route prior to the time at which the route is modified within the computer storage registers. Consequently, operator errors can easily go undetected.

Accordingly, it is an object of this invention to provide an area navigation system including means for rapidly and conveniently entering navigation information into the system to modify a previously established navigation route or establish a new navigation route.

It is another object of this invention to provide an area navigation system in which the operational work load and the probability of operator error are both decreased.

It is a further object of this invention to provide an area navigation system wherein a previously established navigation route is not modified within the system computer until all proposed changes are entered and the tentative new navigation route has been verified.

SUMMARY OF THE INVENTION

These and other objects are achieved in accordance with this invention by an area navigation system including means for rapidly and easily entering navigation route changes directly from a map display unit. More explicitly, in accordance with this invention, a geographic reference point (commonly called a waypoint) can be selected on a computer generated cartographic display of a map display unit and added to, or deleted from, a previously established navigation route by operating a relatively small number of controls located on a display control unit. When the invention is operated to make one or more modifications in a previously established navigation route, the navigation computer calculates the necessary guidance paths between the waypoints of the modified or tentative navigation route. The calculated tentative navigation route is not directly entered into the navigation route memory of the computer, but is temporarily stored in a provisional buffer stage. Additionally, the tentative navigation route is displayed on the map display unit along with the previously programmed navigation route so that the appropriateness of the tentative route can be verified prior to establishment of the tentative route as the navigational course of the aircraft. Upon verification, a selector switch, located on the display control panel, is activated and the tentative navigation route is transferred to the navigation route memory of the navigation computer.

In accordance with the invention, waypoints can be added or deleted in any desired sequence to modify a previously established route or, alternatively to establish a new navigation route having no relationship to a navigation route that may be currently within computer storage. Since any coordinate point displayed on the map display unit can be utilized as a waypoint of the programmed navigation route, the system is not limited to specific waypoints having geographic coordinates stored within the computer, nor to waypoints having known geographic coordinates (i.e., latitude and longitude).

In this invention, selection of a waypoint for addition to or deletion from a navigation route is facilitated by a cursor symbol that is generated on the cartographic display of the map display unit. The position of the cursor symbol is controlled by the area navigation computer in response to a manually operated cursor control located on the display control unit. Preferably the cursor control is a force transducer that can be operated by a finger and thumb or thumb only to provide a signal representative of the direction in which the cursor symbol is to move. Additionally, to permit the selection of waypoints not depicted on the cartographic display in the normal map display mode, the map display can be slewed in each of the coordinate directions. In the preferred embodiment, the cursor control and the control for causing the cartographic display to slew are combined as a single slew control to further simplify system operation.

BRIEF DESCRIPTION OF THE DRAWINGS

FIGS. 3 through 10 are typical map display unit cartographic display patterns that are useful in understanding the operation of this invention.

DETAILED DESCRIPTION

Figure 1:
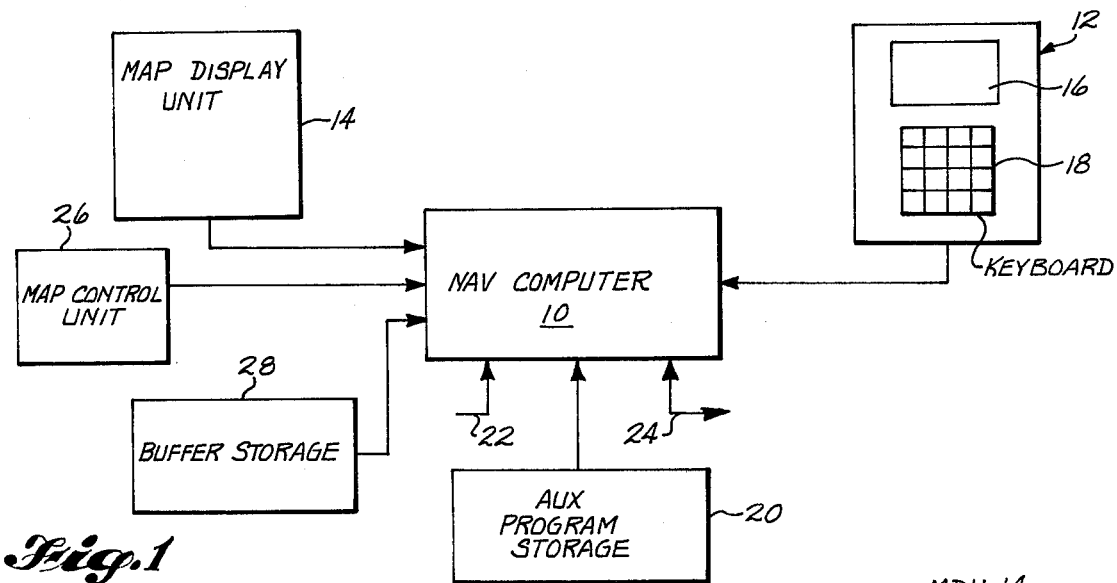
FIG. 1 is a block diagram of an area navigation system including a map display unit configured in accordance with this invention.

Referring to FIG. 1, an area navigation system having a computer 10 interconnected with a control display unit (CDU) 12, and a map display unit (MDU) 14 is illustrated. Computer 10 is a programmable digital computer including storage registers for storing navigation reference information for use in the navigation of a particular geographic region, an arithmetic unit for performing the necessary navigation calculations, and storage registers for storing a navigation route established in accordance with the selected navigation reference points and reference information. The CDU 12 includes a graphic display device 16 and a keyboard 18 having a plurality of switches or keys. Keyboard 18 is utilized to transmit signals to computer 10 for controlling the operation of the computer and for selecting desired portions of the information stored within the computer for display on the display device 16. MDU 14 depicts navigation information supplied by computer 10 as a cartographic display. Generally in prior art systems, the information displayed on the MDU 14 is selected by operation of the keyboard 18 of CDU 12. In such prior art systems the MDU 14 is ancillary to the operation of the system, and hence is supplied as an option that provides an alternative display of the information displayed on the display device 16 of CDU 12. As shall be described in detail hereinafter, in the practice of this invention, the MDU 14 is provided with means for readily controlling the operation of the computer 10 to establish and modify navigation routes. Although such provision could in effect eliminate the need for a conventional CDU, it is contemplated that the CDU will be included in most embodiments of this invention for increasing system versatility, with the MDU 14 being utilized to execute navigation route changes during the flight of the aircraft or at any other time that simple, rapidly executable navigational changes are necessary or desired.

Prior to describing the structural arrangement of the invention, it is advantageous to understand the basic operation of a typical area navigation system. As previously stated, memory units of computer 10 store navigation information for use in establishing a desired navigation route. Such information includes the geographical coordinates of a plurality of geographical reference points within the region that is to be traveled by the aircraft. Additionally, such stored information may include the coordinates of alternative airports, standard route structure customarily used by the operator of the aircraft, and customary flight patterns including standard terminal arrival routes (STAR's), standard instrument departure routes (SID's), and standard holding patterns for airports at which the aircraft will land and airports that may serve as alternative landing places in case of emergency or inclement weather conditions.

The loading of data in the form of selected geographic reference points and predetermined flight patterns such as STAR's, SID's, or customary company routes is accomplished by two alternative methods. First, an auxiliary data storage unit 20 can be used to load either the desired reference points or a previously computed navigation route into the storage registers of navigation computer 10 prior to the departure of the aircraft. Auxiliary data storage unit 20 includes a storage media such as a magnetic disk or magnetic tape cartridge and essentially serves as a playback unit to transfer information recorded on the storage media into the storage registers of computer 10. Hence it can be recognized that in many instances, the aircraft will maintain a library of various data tapes and disks such that appropriate navigation data can be made available to the area navigation system of an aircraft scheduled to fly within various geographic regions.

In situations in which computer 10 does not have sufficient storage capacity to store all navigation data that may be required in flight if, for example, the aircraft must be diverted to another destination, auxiliary navigation program storage unit 20 can be loaded with additional navigation information and carried on board the aircraft. If it becomes necessary, the data stored within auxiliary navigation program storage unit 20 can then be transferred to the memory units of computer 10 to replace navigation data not required for such a change in destination.

The second method of programming an area navigation route is effected by the CDU 12. Programming the area navigation system with CDU 12 includes utilizing keyboard 18 to select various geographic reference points stored in computer 10 as the waypoints of the desired navigation route. Since a large number of reference points and standard flight patterns are generally stored within computer 10 and the display 16 of CDU 12 has a limited display capacity, the selection of waypoints normally requires several operations of the keys of keyboard 18. For example, it is often necessary to initiate the programming of the computer 10 by the activation of a dedicated key of keyboard 18 and then sequentially enter each desired waypoint. Each of these waypoints is generally entered by a multicharacter alphabetic code of a multidigit numeric code and hence requires the operator to sequentially actuate a number of the switches of keyboard 18. Additionally, this procedure requires the operator to either have a prior knowledge of the code designation for each waypoint or to utilize tables or lists of the available waypoints. In many prior art systems, lists of the available waypoints can be displayed on display 16 of CDU by appropriate activation of keyboard 18. Such display of waypoint codes also requires the system operator to select and activate certain switches of keyboard 18. Additionally some prior art systems permit entry of geographic location not among those stored in computer 10. Such waypoints are entered by further operation of the switches of keyboard 18 to enter the waypoints in terms of either specific geographic coordinates (e.g., degrees of longitude and latitude) or a bearing and distance relative to a navaid reference having geographic coordinates stored within computer 10.

In any case, by properly operating the keyboard 18, an operator can select geographic locations for use as waypoints in a desired navigation route with computer 10 calculating the necessary guidance path between the selected waypoints and storing the resulting desired navigation route in appropriate storage registers. Regardless of whether a desired navigation route is established by operation of the CDU 12 or by transfer of data from the auxiliary data storage unit 20, it has become common practice in the operation of area navigation systems to establish a desired navigation route within computer 10 prior to departure of the aircraft. From the time at which the aircraft takes off from the departure terminal, the computer 10 accurately calculates the position of the aircraft relative to the desired navigation route.

The position of the aircraft is computed from information supplied to the computer 10 via input bus 22 from other aircraft systems such as VHF omnirange (VOR) systems, distance measuring (DME) systems and inertial navigation (INS) systems. Signals representative of the aircraft position relative to the programmed navigation route and signals representative of a course that must be followed in order to capture and track the programmed navigation route are computed within computer 10 and are coupled to CDU 12, and MDU 14. In addition, these signals can also be connected to various other aircraft systems such as an automatic flight control system or various instruments for indicating navigation data via output bus 24.

Thus, if the need does not arise to modify the programmed navigation route or establish a completely new navigation route, the area navigation system requires little attention from the flight crew during navigation of the desired route. Usually, prior art area navigation systems are configured such that during a routine flight the pilot or another crew member monitors the progress of the aircraft along the desired navigation route. Such a monitoring mode is initiated by operation of keyboard 18 of CDU 12 to cause the CDU display 16 to indicate the next several waypoints along with pertinent navigation data such as the desired aircraft altitude, magnetic heading, and air speed at each waypoint. Additionally, such prior art systems are generally configured such that the operator can "look ahead" at portions of the navigation route not currently displayed on the CDU display 16. Further because of the computational capacity of computer 10, prior art systems normally provide for the display of navigation data of interest and importance to the flight crew. For example, navigation parameters relative to the present position of the aircraft can be displayed including wind direction and velocity, present ground speed, drift angles, time of day, the identity of and bearing distance to navaids currently supplying the area navigation system with control signals, and the estimated time of arrival at the next waypoint. Such data are selected for display on the CDU 12 by further operation of keyboard 18.

In prior art systems, map display unit 14 is ancillary equipment configured to present a cartographic display of the programmed navigation route and the position of the aircraft along the desired navigation route. Additionally, character generator circuits in MDU 14 may provide a visual indication of the desired air speed and altitude at each waypoint. Generally, in the prior art, the MDU 14 graphically displays information corresponding to the information selected by operation of keyboard 16 and displayed on the CDU display 16.

When it becomes necessary to modify a previously established navigation route or to reprogram the computer 10 with a new navigation route during flight, prior art systems have effected such changes by means of CDU 12. Essentially such changes must be made in the same manner as the initial programming of the area navigation system. Hence, the operator must perform an ordered sequence of operations with each operation requiring one or more operations of keyboard 18. Such a procedure requires a substantial amount of time and since situations in which a modification in flight pattern is necessary often occur during peak activity relative to other crew duties, such time is not readily available. Further, in order to provide the capability of programming the computer 10 and additionally provide the previously described additional display of navigational data, the keyboard 18 of a prior art CDU often includes as many as fifty separate switches or keys. Because of the complexity of the reprogramming procedure, the complexity of keyboard 18, and the time pressure under which the procedure must be effected, the likelihood of operator error increases. If such error remains undetected, the aircraft may be guided along a path different from the desired path and may be subjected to dangers that would otherwise be avoided.

Figure 2:
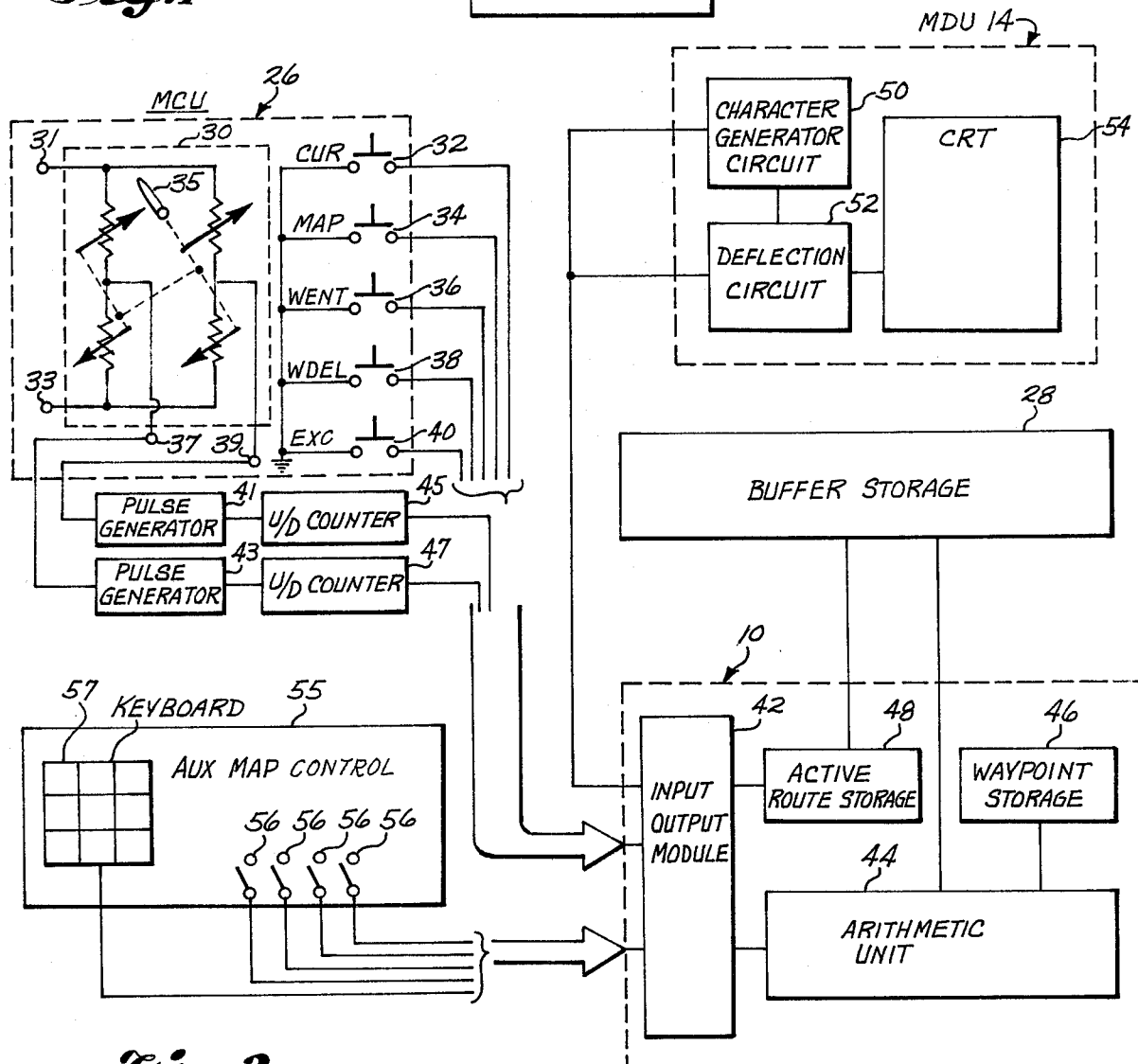
FIG. 2 is a more detailed block diagram of the embodiment of this invention depicted in FIG. 1.

Referring to FIGS. 1 and 2, the arrangement of an area navigation system in accordance with this invention to include means for rapidly modifying a previously established navigation route or rapidly programming a completely new navigation route will now be described. In the depicted embodiment, a map control unit (MCU) 26 includes a plurality of switches for controlling the display of a programmed navigation route, entering new waypoints to modify an existing navigation route or establish a new route, and deleting waypoints from a previously established route. Signals representative of the positions of these control switches are coupled to computer 10 for initiation of the necessary computational operations and appropriate output signals are coupled from computer 10 to MDU 14 to provide an appropriate visual display.

As shown in more detail in FIG. 2, the MCU 26 includes a slew control 30, a cursor (CUR) switch 32, a map switch 34, a waypoint enter (WENT) switch 36, a waypoint delete (WDEL) switch 38 and an execute (EXC) switch 40. As shall be described in more detail hereinafter, the cursor switch 32 is utilized to cause the computer 10 to generate a cursor symbol on the cartographic display of MDU 14 with slew control 30 being utilized to control the position of the cursor symbol on the cartographic display. Preferably, the slew control 30 is a manually operable force transducer that supplies electrical signals proportional to the $x$ and $y$ forces exerted on the slew control actuator. One such device, manufactured by Measurements Systems, Incorporated of Norwalk, Connecticut and designated as the Model 469 Miniature Two Axis Joystick is available with a variety of thumb and/or finger actuator mechanisms. Alternatively, the slew control 30 can be a four position switch which supplies a signal corresponding to a slew up, slew down, slew right or slew left command.

When a slew control 30 that supplies an analog output signal proportional to the actuation force (i.e., the above-mentioned force transducer) is employed, the analog signals are converted to a parallel digital word for use within computer 10. For example, in the embodiment of FIG. 2, the slew control 30 is a resistive bridge configuration in which an operating potential is applied between terminals 31 and 33 to produce an analog signal proportional to the $x$ deflection force exerted on an actuator 35 at terminal 37 and an analog signal proportional to the $y$ deflection force at terminal 39. Terminals 37 and 39 are respectively connected to conventional pulse generators 41 and 43 of the variety which supply a pulse repetition rate proportional to the applied analog signal. The output signals supplied by the pulse generators 41 and 43 are respectively coupled to conventional updown (U/D) counters 45 and 47 which supply output signals to the computer 10. In this arrangement, since the pulse-repetition rate of the signals supplied by the pulse generators 41 and 43 is proportional to the force exerted on the actuator 35, the digital words supplied by the U/D counters 45 and 47 control both the direction and rate of movement of the cursor symbol.

Map control switch 34 is utilized along with slew control 30 to slew the cartographic display in each of the coordinate directions to enable the operator to scan portions of the geographic region not displayed originally on MDU 14. Waypoints to be entered into or deleted from a navigation route are selected by slewing the cartographic display to display the appropriate geographic region and positioning the cursor symbol over the desired waypoint by means of the slew control 30. When a waypoint has been selected to be added to a navigation route, waypoint enter switch 36 is then depressed and an appropriate signal is coupled to the computer 10. When a waypoint is selected by means of the cursor symbol for deletion from an established navigation route, waypoint delete switch 38 is activated and an appropriate signal coupled to computer 10. Activation of waypoint enter switch 36 or waypoint delete switch 38 causes computer 10 to compute the necessary guidance paths for display on MDU 14 as a tentative navigation route. When the tentative navigation route has been verified by the operator of the area navigation system, the execute switch 40 is activated and the tentative navigation path becomes the active navigation route.

Signals representative of the activation state of the switches of MCU 26 are coupled to an input/output module 42 of computer 10. Input/output module 42 effectively serves as an interface between the computational and storage units of computer 10, processing input data from the various other modules of the area navigation system for use within the computer 10 and accessing appropriate stored data within computer 10 for use by the other system modules.

When control signals supplied by the switches of MCU 26 are coupled to the input/output module 42 for establishing a new navigation route or modifying an existing navigation route, arithmetic unit 44 of computer 10 is activated to perform the necessary mathematical calculations. Arithmetic unit 44 is a conventional computer arithmetic unit which accesses the necessary stored information, e.g., the coordinates of waypoints stored in waypoint storage unit 46, performs the necessary calculations and couples the resulting information to a buffer storage unit 28.

In accordance with this invention, as the switches of MCU 26 are operated to establish a new navigation route, the calculated guidance paths thereof are coupled to input/output module 42 which, in turn, couples the data to MDU 14 for display. When the operator of the area navigation system has utilized the switches of MCU 26 to establish a desired navigation path, the path is displayed on MDU 14 for verification of the planned route. If the display corresponds to the desired route, the operator depresses execute switch 40 of the MCU 26 which transfers the navigation route data that is stored in buffer 28 into the active navigation route storage 48 of computer 10. When this operation has been completed, the computer 10 calculates the guidance signals necessary to guide the aircraft along the newly programmed navigation route.

As shown in FIG. 2, the display data is coupled from input/output module 42 of computer 10 to a character generator circuit 50 and a deflection circuit 52 of MDU 14. Character circuit generator 50 and deflection circuit 52 are conventional circuits arranged to generate the desired symbols for display on a cathode ray tube 54 in the form of a map of the relevant geographic area.

Auxiliary map control unit 55 (FIG. 2) is provided to permit the operation of the area navigation system of this invention to control the map display unit 14 independently of CDU 12 (FIG. 1). Switches 56 of auxiliary map control 55 include switches for selecting the various catagories of navigation reference points such as all stored waypoints, airfields, and navaids for selectively displaying these reference points of MDU 14. As the operator activates a particular switch 56, an electrical signal is supplied to the input/output module 42 of computer 10 causing the computer to access the selected category of geographic references within the computer storage registers and couples the information to MDU 14 for display. In addition, auxiliary map control 55 preferably includes a keyboard 57 having numeric keys representative of the digits 0 to 9, and an altitude switch and an airspeed switch among the switches 56. Activation of the altitude or airspeed switch with subsequent operation of the keyboard 57 allows the operator of the area navigation system to modify the desired altitude or airspeed at any waypoint that is selected on MDU 14 with the cursor symbol.

It should be recognized that, although prior art systems may provide for the reprogramming of altitudes and/or airspeeds and may provide display of additional navigational data on the MDU 14, the provision of auxiliary map control 55 is advantageous for at least two reasons. First, auxiliary map control 55 groups the controls necessary to operate the MDU 14 of this invention in a single location. Such arrangement greatly enhances the efficiency of operation in that the system operator need not operate the CDU controls while utilizing the MDU 14 to modify or establish a navigation route. Secondly, and most importantly, prior art systems have not supplied the display flexibility provided by the use of auxiliary map control 55. For example, in a typical prior art system, only two display modes are provided with the first mode depicting the position of the aircraft along the programmed navigation route and the second display mode further depicting all other stored navigation reference points. The display of a programmed navigation route along with all other navigation reference points often results in an extremely complex or cluttered presentation. Such a display, although satisfactory in the prior art where the CDU 12 is utilized to effect in-flight navigation route modification or navigation route programming, does not present information in the most efficient manner when the MDU 14 is to be utilized to reprogram the computer 10. For example, in the modification of a navigation route the operator may be interested in only one or two of the various classes of stored navigation reference points, e.g. navaids within that particular area and available landing fields. In the preferred embodiment of this invention, the operator simply activates appropriate switches 56, e.g., a navaid and landingfield switch, to display the desired features and can then rapidly operate the invention to program the desired course without the distraction of unnecessary display symbols.

Referring now to FIGS. 3 through 8, the operation of the embodiment of this invention depicted in FIGS. 1 and 2 to modify a previously programmed navigation route will now be described. For purposes of illustration, such modification of a previously established navigation route can be classified into three distinct situations. First, it may be necessary to eliminate one or more waypoints from an existing route to form a new route from the remaining waypoints. Secondly, it may be necessary to divert the aircraft from a previously established navigation route and rejoin that navigation route at a specific geographic location, e.g., when the aircraft is instructed to enter a holding pattern prior to following a previously programmed landing approach pattern. Thirdly, it may be necessary to divert the aircraft from a previously established navigation route entirely, e.g., when an aircraft is instructed to land at an alternative airport within the same geographic region as the original destination.

The operation of the invention in each of these situations will be discussed relative to a typical standard approach route (STAR). In FIG. 3, a portion of the cartographic display of MDU 14 for a standard approach route (STAR) for landing at La Guardia airport is depicted. In FIG. 3, the navigation route waypoints are symbolized as four pointed stars 60, with the identification of each waypoint, the desired aircraft air speed, and the desired aircraft altitude at each waypoint being displayed adjacent to the respective waypoint symbol. The navigation guidance path between each successive pair of waypoints is dispalyed as a solid line 62 and the aircraft symbol 64 is of a triangular shape. Hence, it can be seen in the situation depicted in FIG. 3 that the aircraft is proceeding on course from the waypoint VERRO toward the waypoint LGA from where it will fly to waypoint BRONX, then to waypoint ORADL, then to waypoint TETEO, landing at waypoint LGA after passing over waypoint PALPK. In addition, the map display unit display depicted in FIG. 3 includes a generally Y-shaped character 66 denoting a navaid station identified as JFK and a character resembling the Greek letter phi denoting a landing field identified as KTEB.

The operation of the invention to delete one or more waypoints from a previously programmed navigation route can be understood with reference to FIGS. 4 and 5. In the depicted example, the waypoint ORADL is to be eliminated from the STAR depicted in FIG. 3 so that the aircraft will make a landing at LGA by following the course LGA to BRONX, BRONX to TETEO, and TETEO to LGA via PALPK. To effect this change, the system operator first depresses cursor switch 32. Activation of cursor switch 32 supplies an electrical signal to computer 10 causing the computer to supply a signal to the character generator circuit 50 and the deflection circuit 52 of MDU 14 for the generation of the cursor symbol 70. As shown in FIG. 4, one convenient cursor symbol for the practice of this invention is a circle large enough to substantially encompass the waypoint symbols. When the cursor switch is depressed, the cursor initially is positioned at the center point of the cathode ray tube 54. Activation of the cursor switch 32 also causes the active navigation route data stored in active storage register 48 to be transferred to buffer storage 28. The cursor symbol 70 is then positioned over, or nearly over, the ORADL waypoint symbol by means of the slew control 30. As previously described, during this procedure, slew control 30 preferably supplies signals to computer 10 indicative of the direction in which the cursor symbol 70 is to move and signals indicative of the speed at which the cursor symbol is to be moved (i.e., highspeed or lowspeed slewing).

Once the cursor symbol 70 is positioned over the ORADL waypoint, the waypoint delete switch 38 is depressed. Depressing waypoint delete switch 38 supplies a signal to computer 10 causing the computer to scan the waypoints stored in buffer 28. Locating the waypoint ORDAL in buffer 28, the computer eliminates this waypoint and the guidance paths between the deleted waypoint and the next most waypoints, i.e., the guidance path between ORADL and TETEO and the guidance path between ORADL and BRONX. At this point in the sequence, the MDU display is as shown in FIG. 4. If the display of FIG. 4 corresponds to the desired change, the system operator then activates the execute switch 40.

Execute switch 40 supplies a signal to computer 10 that causes the computer to calculate a new guidance path between the waypoint BRONX and the waypoint TETEO. This calculation is performed within arithmetic unit 44 and coupled to buffer storage 28. When the calculation has been completed the navigation route stored in buffer 28 is coupled to active storage 48 to become the active navigation route. At this point, the new route is displaced on the cathode ray tube 54 of MDU 14 as shown in FIG. 5. If prior to activating the execute switch 40 the operator discovers that the cartographic display does not correspond to the desired modification, or if the operator decides not to make the modification, the cursor switch 32 can be activated to restore the system to the condition it was in prior to initiating the course modification sequence, i.e., restore the navigation path depicted in FIG. 3.

Figure 7:
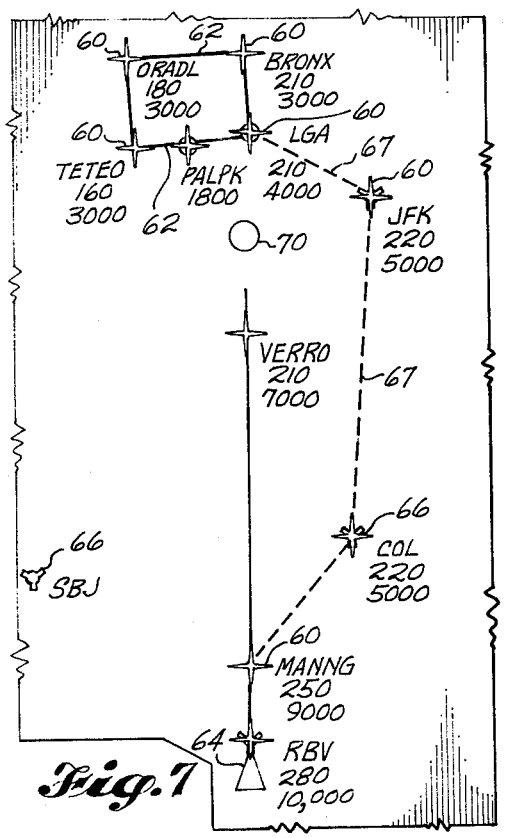
Figure 8:
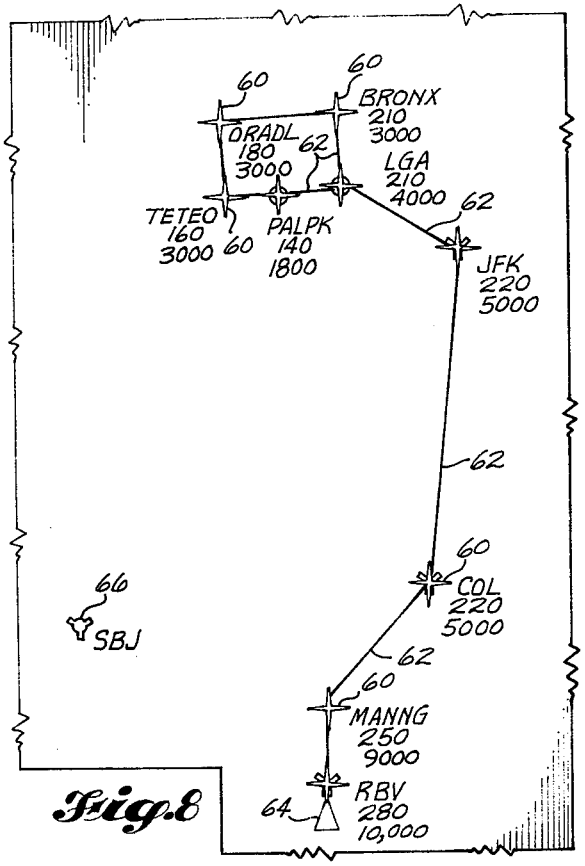

The operation of the invention to effect a more complex modification of a navigation route can be understood with reference to FIGS. 6 through 8. FIG. 6 depicts the STAR of FIGS. 3 through 5 illustrating the complete landing approach pattern from Robinsville, New York (RBV) to La Guardia Airport (LGA) and additionally depicts navigation aids located at SBJ, COL, and JFK. In the following example it is assumed that it is necessary or desirable to reroute the aircraft such that the aircraft does not fly from waypoint MANNG to waypoint VERRO and then to waypoint LGA to proceed on a landing approach, but instead flys directly from waypoint MANNG to the navaid COL then to the navaid JFK and rejoins the previously programmed navigation route at waypoint LGA. To effect this route modification, the system operator first deletes the waypoint VERRO as described above. That is, the cursor symbol 70 is activated by means of the cursor switch 32 and slewed to the position of the VERRO waypoint with the slew control 30 as depicted in FIG. 6. After the waypoint delete switch 38 has been depressed, the cursor symbol 70 is slewed to the position of the waypoint COL by means of the slew control 30. The waypoint enter switch 36 is then depressed. Activating waypoint enter switch 36 couples a signal to computer 10 causing the computer to search the waypoint storage register 46. Locating a stored waypoint corresponding to the position of cursor symbol 70, the coordinates of the waypoint are transferred to buffer storage 28 and arithmetic unit 44 calculates a guidance path between the waypoint MANNG and the new waypoint COL. The cursor symbol 70 is then slewed to the next additional waypoint JFK and the waypoint enter switch 36 is again depressed. Finally, the cursor symbol 70 is slewed to the waypoint LGA at which the aircraft will reenter the previously programmed navigation route and the waypoint enter switch 36 is again depressed. At this point, buffer storage 28 will contain the added waypoints and the corresponding guide paths calculated by arithmetic unit 44.

As shown in FIG. 7, this information is displayed on the cathode ray tube of MDU 14 with the tentative new navigation route being depicted in the form of dotted lines 67 so that the system operator can distinguish the tentative route from the active (or previously programmed) navigation route. Upon verification of the tentative route, the system operator depresses the execute switch 40 to thereby transfer the tentative route from buffer storage 28 to the active storage 48. At this point, the navigation route is displayed in solid lines as shown in FIG. 8 and becomes the navigation route to be followed by the aircraft.

If the new navigation route was not to rejoin the previously established navigation route but was, for example, a rerouting of the aircraft for landing at John F. Kennedy Airport (JFK of FIGS. 6 through 8), the previously described procedure would be followed except that the waypoint LGA would not be added by means of the cursor symbol 70 and the waypoint enter switch 36. In such a case, a portion of the previously established navigation route that is not connected to the tentative route would be eliminated from the buffer storage 28 as the execute switch 40 is depressed. Hence, the navigation route and the display of MDU 14 would correspond to that portion of the navigation route depicted in FIG. 8 that interconnects waypoint RBV with the terminal waypoint JFK.

In some circumstances, it may be necessary or desirable to add a waypoint to a navigation route wherein the waypoint to be added is not among the waypoints stored within waypoint storage 46 of computer 10. In this respect, the system operator can place the cursor symbol 70 over any desired point on the cartographic display of MDU 14. When the waypoint enter switch is activated, a search of the waypoint storage 46 fails to yield a corresponding stored waypoint and arithmetic unit 44 computes the geographic coordinates (i.e., the longitude and latitude) corresponding to the center point of the cursor symbol 70. These geographical coordinates are transferred to buffer storage 28 and utilized within arithmetic unit 44 for the calculation of the desired guide paths. Such waypoints are preferably identified on the MDU display according to a programmed naming routine. For example, the first added non-stored waypoint may be labeled X1, the second may be labeled X2, and so forth. In addition, if the altitude and air speed switches 56 of auxiliary control panel 55 are not utilized in conjunction with keyboard 57 as each new waypoint is selected, computer 10 calculates an air speed and altitude by a conventional mathematical interpolation process based on the air speed and altitude at adjacent waypoints.

Figure 9:
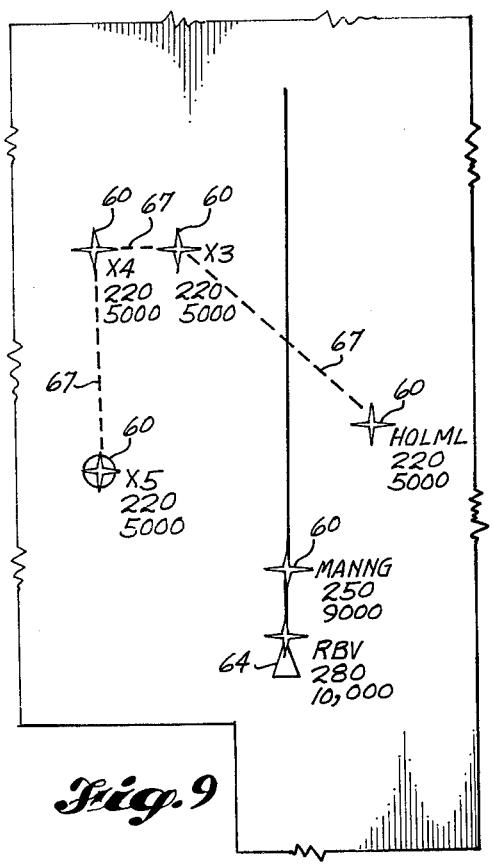
Figure 10:
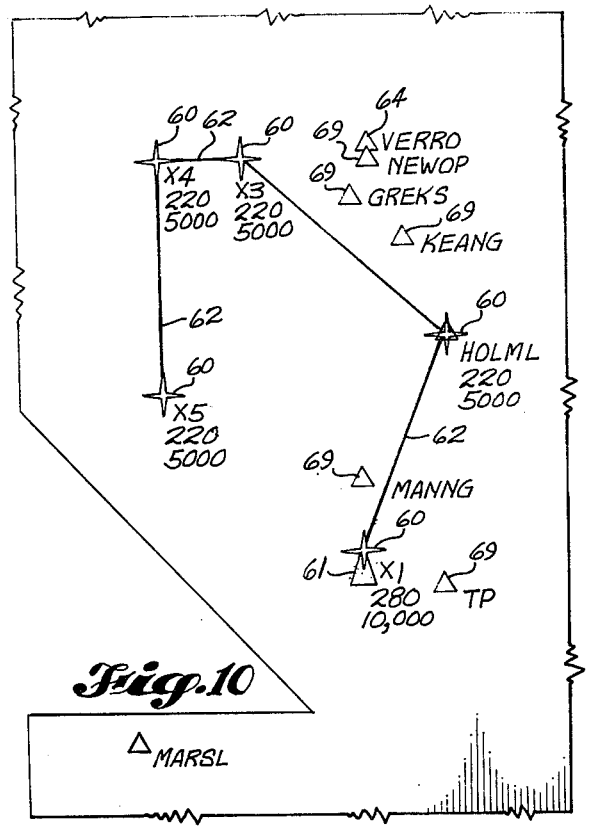

The use of waypoints not previously stored within computer 10 and the programming of a new navigation route extending from the present position of the aircraft to a new destination can be understood with reference to FIGS. 9 and 10. In the situation depicted in FIG. 9, the aircraft is in flight near waypoint RBV at an altitude of 10,000 feet and air speed of 280 nautical miles per hour on a heading bound for waypoint MANNG. In the tentative navigation route depicted in FIG. 9, the system operator has added waypoints HOLML, X3, X4, and X5 in the previously described manner with waypoints X3, X4, and X5 being purely arbitrary points on the cartographic display that are chosen by the operator or alternatively being geographic locations having a known distance and magnetic bearing from a stored waypoint, e.g., a navaid. When the operator has activated the waypoint enter switch 36 to enter waypoint X5 in the buffer 28, the cartographic display of FIG. 9 does not include a dashed guidance path 67 interconnecting the aircraft symbol 64 with waypoint HOLML because of the time-varying position of the aircraft. When the operator activates the execute switch 40, the tentative route is transferred from the buffer storage 28 to the active route storage 48 with the cartographic display as depicted in FIG. 10. In addition, the cartographic display of FIG. 10 also depicts the additional waypoints (denoted by small triangular symbols 69) that are stored within waypoint storage 46 for the depicted geographic region. As previously described, the inclusion of such waypoints in the cartographic display is effected by operation of a switch 56 on auxiliary map control 55.

Figure 11:
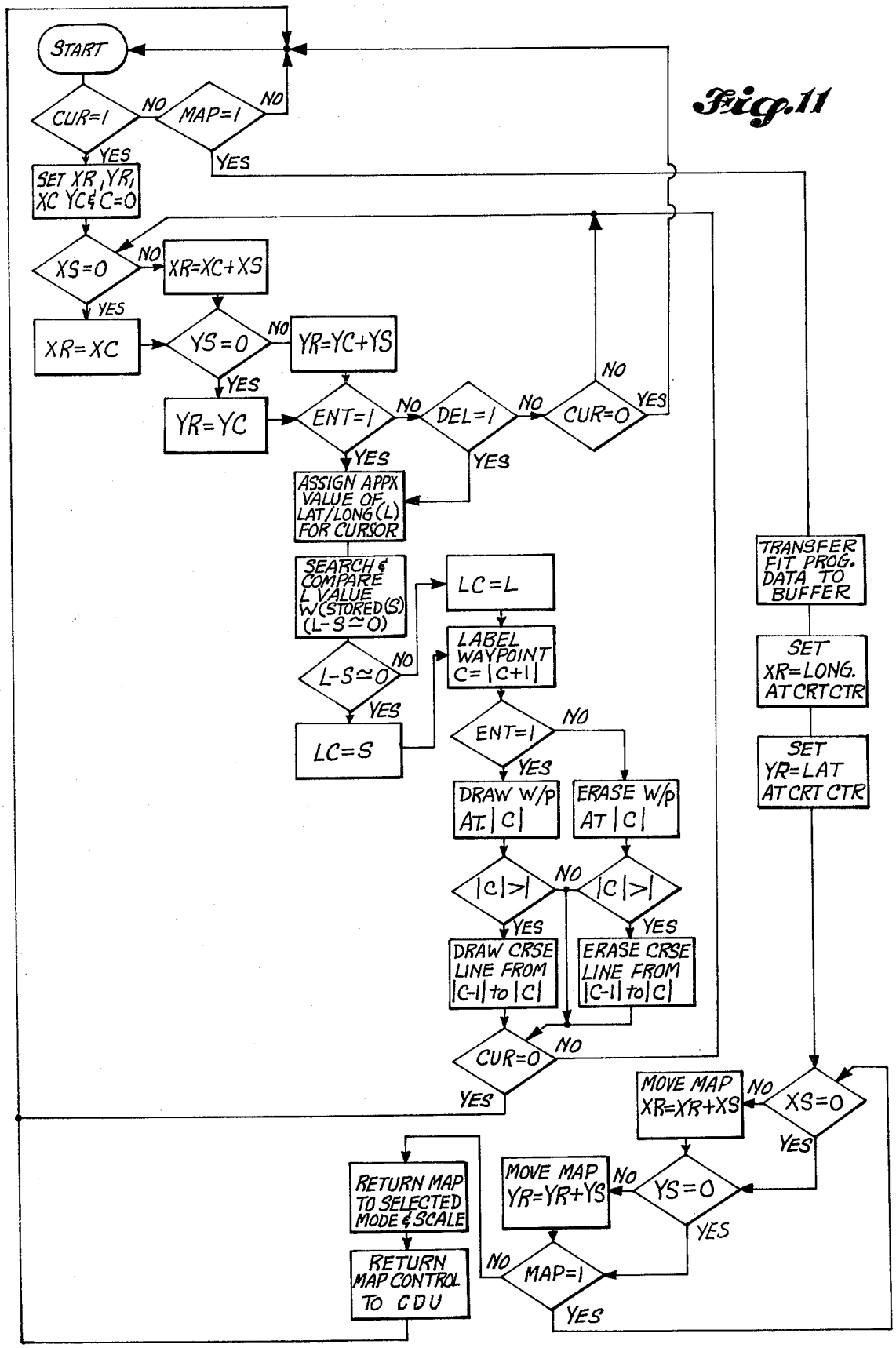
FIG. 11 is a computational flow chart that is useful in understanding the operation of this invention.

FIG. 11 depicts a flow chart that illustrates the sequencing of computer 10 to provide the previously described operation of this invention. In the practice of this invention, when the MDU unit 14 is activated, the computer 10 periodically cycles from the "START" condition through the sequence of FIG. 11 to determine if cursor switch 32 or map switch 34 is activated. If the cursor switch 32 is activated, i.e., the program input CUR is equal to one, the values XC, YC, XR, YR, and C (which respectively represent the X and Y positioned coordinates of the center point of the cursor symbol 70, e.g., longitude and latitude; the current values within a longitude and a latitude storage register of computer 10; and the waypoint address) are initialized at a value of zero. Next, it is determined whether the slew control 30 is being operated to cause the cursor 70 to move in the ± X direction (i.e., to move in a direction corresponding to changing longitude). If the slew control 30 is not so activated (i.e., program input XS equals 0), the value within the longitude storage register (XR) is set equal to the longitude corresponding to the center point of the cursor symbol 70 (XC) and the computer 10 proceeds to determine whether the slew control 30 is being operated to cause the cursor to move in the ± Y direction (i.e., to move in a direction corresponding to changing latitude) by determining if YS is equal to zero. If the slew control 30 is activated to slew the cursor symbol 70 in the X direction (XS not equal to zero) the value within the longitude register, XR, is established equal to the sum of the longitude corresponding to the center point of cursor 70 (XC) and an incremental value XS prior to advancing to the determination of cursor deflection in the Y direction. Thus, while the slew control 30 is activated in the X direction, the value, XR, stored in the longitude register accumulates such that the value of XR when the slew switch is released represents a longitude corresponding to the position of cursor 70 on the cartographic display of MDU 14.

Next, the activation of the slew control 30 for slewing in the ± Y direction is tested in an analogous manner such that the latitude storage register contains a value YR representative of the position of cursor symbol 70 when the slew control 30 is released. When it is determined that the cursor symbol 70 is stationary (XS and YS equal zero), the activation states of the waypoint enter switch 36 and the waypoint delete switch 38 are determined. Operating switch 36 or 38 respectively sets the program input ENT or DEL equal to one and causes the computer 10 to assign an approximate longitude and latitutde, L, to the geographic point selected by cursor symbol 70. The computer 10 then searches through the waypoints stored in waypoint storage 46 for a stored waypoint S having a longitude and latitude within a predetermined increment of the longitude and latitude of geographic point L. If such a waypoint S, is located, the waypoint represented by the cursor position, LC, is set equal to S. If such a waypoint S is not located, the cursor position waypoint LC is set equal to the longitude and latitude corresponding to the cursor position, L (longitude of XR, latitude of YR). A waypoint label is then generated which either corresponds to the label previously assigned to the stored waypoint S or a new waypoint label is generated if the cursor is not positioned at a stored waypoint. This waypoint label is stored at an address C, with the address C being incremented to the next successive address location each time a waypoint is stored.

Next, the operational state of the waypoint enter switch 36 is again determined. When switch 36 is activated, the program input ENT is equal to one, the waypoint is graphically displayed on MDU 14, and the guidance path between the added waypoint and the adjoining waypoints are calculated by computer 10, stored in buffer storage 28 and displayed on the MDU 14. If the waypoint enter switch 36 is not depressed, then, by default, program input DEL is equal to one indicating that the waypoint delete switch 38 is operated. In this case, the selected waypoint is erased from the display of MDU 14, along with the guidance paths connecting the selected waypoint to adjoining waypoints of the displayed navigation route. After the selected waypoint is added to, or deleted from, the cartographic display, the operational state of the cursor switch 32 is again tested. If the cursor switch is not activated (CUR equals zero), the computer 10 recycles to the start of the program. If the cursor switch is activated, the computer 10 reenters the program at the point where the coordinates of the cursor symbol 70 are determined.

If it is determined in the previously described operational sequence that neither the waypoint enter switch 36 or the waypoint delete switch 38 is activated (i.e., program inputs ENT and DEL both equal zero), the operational state of the cursor switch 32 is again determined. If the cursor switch 32 is not activated (program input CUR equals zero), the computer 10 returns to the start of the computational sequence for recycling at the next appropriate time. If the cursor switch 32 is activated, the computer 10 reenters the program at the point where the coordinates of the cursor symbol 70 are determined.

If at the beginning of the program sequence the cursor switch 32 is not activated (program input CUR is equal to zero), but the map switch 34 is activated, (i.e., program input MAP is equal to one), the computer 10 repositions the cartographic display of MDU 14 according to the activation of the slew control 30. As can be seen in FIG. 11, this sequence facilitates the transfer of the necessary navigation data (e.g., waypoints) to the buffer storage 28 and the establishing of the values of XR and YR in the longitude and latitude storage registers equal to a longitude and latitude that correspond to the center point of the cathode ray tube 54. With the system thus initialized, the operational state of the slew control 30 is determined.

If the slew control 30 is activated to slew the map along the X axis (program input XS equals one) the computer moves the map display in this direction until the slew control is returned to the normal position. When the slew control is not activated in the X direction (XS equals zero), the operational state of the slew control 30 relative to the Y direction is tested. If the slew control 30 is activated in the Y direction (YS does not equal zero), the cartographic display is moved in this direction until the slew control 30 is released (program input YS equals zero). When YS is equal to zero, the operational state of the map switch 34 is again determined. If the map switch 34 is operated (program input MAP equals one), the computer 10 reenters the map slewing sequence at the point where the operational state of the slew control 30 is determined. If the map switch 34 is not activated (programmed input MAP equals zero), control of the map display is returned to the computer 10 for the display of the progress along the displayed navigation route. At this point, the computer reverts to the start of the programmed sequence for beginning another cycle.

It will be understood by those skilled in the art that the depicted embodiment is exemplary in nature and that many variations therein may be practiced without departing from the scope and spirit of this invention. For example, where the invention is practiced as a modification of an existing area navigation system having sufficient storage registers within computer 10, or in the situation in which the invention is practiced in the initial design of an area navigation system, buffer storage 28 can be realized as a portion of the storage registers within computer 10 rather than as a separate unit as depicted herein. In situations in which sufficient storage registers are not available within computer 10, buffer storage 28 can be a separate entity or included within other system components, e.g., MDU 14. Further, slew control 30 can be realized, by a variety of conventional devices that are manually operable to slew the cursor symbol 70 of the cartographic display of MDU 14 in a direction rather than providing slewing along the coordinate directions as described herein.

What is claimed is:

1. In an area navigation system wherein a desired navigation route including at least one guidance path between selected geographic points is stored within storage means of an area navigation computer, the improvement comprising a map display unit for providing a cartographic display of navigation information relative to said desired navigation route, said map display unit having data entry means for entering navigation information to said area navigation computer, said data entry means including:
   cursor means positionable on said cartographic display for selecting a geographic point within the geographic region depicted by said cartographic display;
   first and second switch means, said first switch means for supplying a signal representative of the positional coordinates of a geographic location selected with said cursor means when said geographic location is to be eliminated from a previously established desired navigation route, said second switch means for supplying a signal representative of the positional coordinates of the geographic location selected by said cursor when said geographic location is to be added to a previously established desired navigation route, said first and second switch means supplying said signals to said computer for the calculation of guidance paths between said selected geographic locations;
   buffer storage means for storing the guidance paths calculated by said computer in response to said signal supplied by said first and second switch means as a tentative navigation route;
   means for displaying said tentative navigation route on said map display unit, said tentative navigation route being displayed as a visible pattern discernible from said previously established desired navigation route; and
   third switch means for transferring said tentative navigation route from said buffer storage means to said computer storage means for replacing said previously desired navigation route with said tentative navigation route.

2. The improvement of claim 1 wherein said map display unit further comprises means for slewing said cartographic display to display additional geographic regions relative to said desired navigation route and said tentative navigation route.

3. The improvement of claim 2 wherein said means for slewing said cartographic display includes means for controlling the position of said cursor means on said cartographic display.

4. The improvement of claim 1 further comprising means for transferring data to said computer representative of the desired altitude at each of said geographic locations entered by operation of said second switch means and means for displaying said altitude data on said cartographic display.

5. The improvement of claim 1 further comprising means for transferring data to said computer representative of the desired air speed at each of said geographic locations entered by operation of said second switch means and means for displaying said desired air speed on said cartographic display.

6. In an area navigation system having a programmable digital computer, a control display unit and a map display unit wherein said programmable digital computer includes means for storing signals representative of the coordinates of a plurality of geographic locations, means for calculating the present position of an aircraft relative to a guidance path formed between selected ones of said geographic locations and means for the calculation of flight corrections necessary to maintain said aircraft on said guidance path, said control display unit including means for displaying selected flight information relative to said present aircraft position and relative to said guidance paths, said control display unit further including means for selecting said geographic locations to establish said guidance path and means for modifying a previously established guide path, said map display means including a map display area for supplying a cartographic display including said present aircraft position and said guidance path, the improvement comprising navigation route control means for establishing and modifying said guidance path from said cartographic display of said map display unit, said navigation route control means being operable independently of said control display unit, said navigation route control means including:

cursor means positionable within the geographic area displayed on said cartographic display of said map display unit for selecting a particular geographic location;

first switch means for transferring a signal representative of the coordinates of the geographic location selected by said cursor means to said computer when said geographic location is to be eliminated from a previously established guidance path;

second switch means for transferring a signal representative of the geographic coordinates of the geographic location selected by said cursor means to said computer when said geographic location is to be added to a previously established guidance path;

buffer storage means for temporarily storing a tentative guidance path calculated by said computer in response to said signals transferred to said computer by said first and second switch means;

means for coupling signals representative of said tentative guidance path to said map display unit for display in conjunction with said previously established guidance path, said displayed tentative guidance path being visibly distinguishable from said previously established guidance path; and means for transferring said tentative guidance path to said storage means of said digital computer to replace said previously established guidance path with said tentative guidance path.

7. The improvement of claim 6 wherein the geographic region included within said cartographic display and said position of said cursor are selectively controllable by manually operated switch means, said manually operated switch means supplying signals to said computer to move said cursor and said cartographic display in a vertical and horizontal direction relative to said map display unit display area.

8. The improvement of claim 6 further comprising means for transferring data to said computer representative of a desired altitude at each of said geographic locations entered by operation of said second switch means and means for displaying said desired altitude on said cartographic display.

9. The improvement of claim 6 further comprising means for transferring data to said computer representative of a desired air speed at each of said geographic locations entered by operation of said second switch means and means for displaying said desired air speed data on said cartographic display.

10. An area navigation system for directing an aircraft along a preselected navigation route, said preselected navigation route including a plurality of selected geographical reference points, said area navigation system comprising:

a programmable digital computer including means for storing the geographic coordinates and identification of a plurality of geographic reference points and means for storing the guidance paths to be flown in order to maintain said aircraft on said preselected navigation route, said programmable digital computer further including an arithmetic unit for determining said preselected navigation route from said selected geographic reference points;

a map display unit for supplying a cartographic display of said preselected navigation route, said map display unit including cursor means for selecting any geographic point included in said cartographic display;

means for selectively controlling the position of said cursor means on said cartographic display;

buffer storage means for storing a tentative navigation route;

means for transferring said preselected navigation route to said buffer storage means;

first switch means for supplying a first control signal to said programmable digital computer, said computer being responsive to said first control signal for deleting the geographic reference points selected by said cursor means from said tentative navigation route within said buffer storage means, said computer being further responsive to said first control signal for recalculating said tentative navigation route after said selected geographic reference point has been deleted;

second switch means for supplying a second control signal to said programmable digital computer, said computer being responsive to said second control signal for adding a geographic reference point selected by said cursor means to said tentative navigation route stored within said buffer storage means, said computer being further responsive to said second control signal for recalculating said tentative navigation route after said selected geographic reference point has been added;

means for displaying said tentative navigation route stored in said buffer storage means on said map display unit; and means for transferring said tentative navigation route stored in said buffer storage to said digital computer storage means for storing said tentative navigation route as said preselected navigation route.

11. The area navigation system of claim 10 further comprising means for slewing said cartographic display of said map display unit for selecting additional geographic reference points within a predetermined distance of said preselected navigation route.

12. The area navigation system of claim 11 wherein said means for slewing said cartographic display and said means for selectively controlling the position of said cursor means includes a switch having operational states selectively causing said cartographic display and said cursor means to move in an upward, downward, left and right direction relative to the display region of said map display unit.

* * * * *